US008403341B2

(12) United States Patent
Zaiser et al.

(10) Patent No.: US 8,403,341 B2
(45) **Date of Patent: *Mar. 26, 2013**

(54) ADAPTER FOR A MOTOR-DRIVEN MACHINE TOOL WITH A ROTATABLY DRIVEABLE TOOL

(75) Inventors: Adolf Zaiser, Koengen (DE); Jens Blum, Filderstadt (DE); Marco Braun, Stuttgart (DE); Heiko Roehm, Stuttgart (DE); Daniel Grolimund, Zuchwil (CH); Katharina Holzer, Prague (CZ)

(73) Assignee: Robert Bosch GmbH, Stuttgart (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/292,291

(22) Filed: Nov. 9, 2011

(65) Prior Publication Data

US 2012/0056388 A1 Mar. 8, 2012

Related U.S. Application Data

(62) Division of application No. 12/439,881, filed on Mar. 4, 2009, now Pat. No. 8,113,520.

(30) Foreign Application Priority Data

Apr. 19, 2007 (DE) ..................... 20 2007 007 294 U
Aug. 3, 2007 (DE) ......................... 10 2007 036 786

(51) Int. Cl.
*B23B 31/02* (2006.01)

(52) U.S. Cl. ..... 279/143; 279/128; 279/141; 83/698.41; 451/357; 451/359

(58) Field of Classification Search .................. 279/141, 279/143–145; 83/665, 666, 698.41; 408/239 A; 451/357, 359; *B23B 31/02*
See application file for complete search history.

(56) References Cited

U.S. PATENT DOCUMENTS

| | | | | |
|---|---|---|---|---|
| 4,642,006 | A * | 2/1987 | Wirfelt | 409/233 |
| 6,062,960 | A * | 5/2000 | Kai et al. | 451/357 |
| 6,942,437 | B2 * | 9/2005 | Ripley et al. | 409/234 |
| 7,217,177 | B2 * | 5/2007 | Frech et al. | 451/359 |
| 8,011,848 | B2 * | 9/2011 | Sockman et al. | 403/348 |
| 2007/0079489 | A1 * | 4/2007 | Cirino | 29/33 K |
| 2009/0083916 | A1 * | 4/2009 | Lampka et al. | 15/3.53 |
| 2010/0054885 | A1 * | 3/2010 | Goetz et al. | 408/239 A |
| 2010/0133761 | A1 * | 6/2010 | Waggle et al. | 279/143 |
| 2010/0232894 | A1 * | 9/2010 | Burton et al. | 408/9 |
| 2011/0227300 | A1 * | 9/2011 | Zhang et al. | 279/143 |
| 2011/0260414 | A1 * | 10/2011 | Ota et al. | 279/8 |
| 2011/0291368 | A1 * | 12/2011 | Chen et al. | 279/143 |
| 2012/0169018 | A1 * | 7/2012 | Lu et al. | 279/143 |

* cited by examiner

*Primary Examiner* — Eric A Gates
(74) *Attorney, Agent, or Firm* — Michael J. Striker

(57) ABSTRACT

An adapter is provided for a motor-driven machine tool which includes a tool driven in an oscillating rotational pendulum motion. The machine tool includes a driveable tool shaft (1), the end face of which is designed as a locating flange (2) having at least one form-fit element (3) for receiving and fastening the tool (5). The adapter (9) includes, on an end face (16), form-fit counter elements (10) which are matched to the form-fit elements (3) of the tool shaft (1). A plurality of axially projecting mandrels (11) is distributed around the circumference on the opposite end face (13) of the adapter (9).

14 Claims, 1 Drawing Sheet

ADAPTER FOR A MOTOR-DRIVEN MACHINE TOOL WITH A ROTATABLY DRIVEABLE TOOL

CROSS REFERENCE TO RELATED APPLICATION

The present application is a divisional application of U.S. application Ser. No. 12/439,881 filed Mar. 4, 2009 now U.S. Pat. No. 8,113,520. The invention described and claimed hereinbelow is also described in PCT/EP2008/053950, filed Apr. 2, 2008, DE 202007007294.5, filed Apr. 19, 2007, and DE 102007036786.6, filed Aug. 3, 2007. These German Patent Applications, whose subject matter is incorporated here by reference, provides the basis for a claim of priority of invention under 35 U.S.C. 119 (a)-(d).

BACKGROUND OF THE INVENTION

The present invention relates to an adapter for a motor-driven machine tool which includes a rotatably driveable tool, in particular for a hand-held power tool.

DE 10 2004 050 798 A1 describes a hand-held power tool which includes an electric motor-driven tool on a tool shaft, on the end face of which a fastening device is situated for receiving a tool. The fastening device is composed of a radially expanded locating flange with form-fit elements which project axially away from the end face, and which extend into assigned receptacles in a fastening section of the tool once the tool has been installed. The tool is secured to the drive shaft with the aid of a fastening screw which is screwed into a threaded bore formed in the end face of the drive shaft. The form-fit elements provide a form-fit connection between the tool and the drive shaft in the circumferential direction for transferring the rotational motion to the tool.

To ensure that the tool and drive shaft may be connected, however, the form-fit elements on the end face of the drive shaft must conform geometrically with the associated recesses in the fastening section of the tool.

SUMMARY OF THE INVENTION

The object of the present invention is to non-rotatably connect tools having various fastening receptacles to the tool shaft of a machine tool.

The adapter for a motor-driven machine tool which includes a rotatably drivable tool, in particular for a hand-held power tool, includes, on a first end face, form-fit counter elements which are matched to the form-fit elements situated on the end face of the tool shaft. A plurality of axially projecting mandrels is located on the second, opposite end face of the adapter. These mandrels enable a high frictional connection to be established between the tool shaft and the tool in the axial direction and in the circumferential direction, the frictional connection being strong enough to transfer the forces and torques which occur during operation between the tool shaft and the tool without affecting the functionality. The pointed mandrels on one of the end faces of the adapter penetrate the fastening section of the tool slightly, thereby establishing an at least approximate form-fit connection in the circumferential direction, but, due to the frictional connection, the transferrable forces are at least great enough to ensure proper operation while preventing slip between the drive or tool shaft and the tool in the circumferential direction.

Since the adapter includes form-fit counter elements on the side facing the tool shaft, which are matched to the form-fit elements of the tool shaft, a form-fit connection is realized on this side. The mandrels on the opposite end face of the adapter may be connected to various fastening sections of various tools, regardless of whether these fastening sections themselves are equipped with form-fit counter elements.

To ensure that the connection between the tool and the tool shaft is secure, in particular in the axial direction, the adapter is annular in design and includes a central recess for receiving a securing element, e.g. a fastening screw. This central recess is bounded by a connector which advantageously extends—as viewed in the axial direction—past the end face on which the mandrels are located, the mandrels preferably having a shorter axial extension away from the end face than does the connector. In the operating position, the projecting connector extends into a corresponding recess in the fastening section of the tool, so that the end face of the fastening section comes to bear against the tips of the mandrels. The axial overhang of the connector relative to the mandrels also serves as a safeguard which prevents sensitive surfaces from becoming accidentally scratched if the adapter is set down with the mandrels pointing downward, since the adapter is placed on the connector and the tips of the mandrel are located a slight distance away from the surface on which the adapter is placed.

The mandrels which are preferably designed as a single piece with the adapter advantageously have a conical shape, although other geometries may be considered for the mandrels provided they include a tip. According to a further advantageous embodiment, the mandrels are enclosed by an annular recess which is set back axially relative to the end face plane on which the mandrels are located. This recess makes it possible to receive dirt and dust particles from the fastening section of the tool, thereby ensuring better contact between the mandrels and the surface of the fastening section even in the dirty state. The axial depth of the recess, which extends in the direction opposite to the extension of the mandrels, is advantageously less than the axial overhang of the mandrels, and is, e.g. approximately half as great as the raised area of mandrel is high.

To establish a fixed connection between the adapter and the tool in the sense of a forced or quasi form-fit connection, a plurality of mandrels—which are identical in design, in particular—is provided on the adapter. A plurality of mandrels may be situated one after the other as viewed in the radial direction, e.g. being distributed around the circumference in a large number of radial rows of this type. For example, each radial row of mandrels is situated between two adjacent form-fit counter elements in the adapter. The number of rows of mandrels is therefore identical to the number of form-fit counter elements in the adapter.

It may also be expedient to design the form-fit counter elements in the adapter as recesses which are used to receive the form-fit elements which are typically designed as raised areas on the end face of the tool shaft. In order to connect the adapter to various tool shafts having different form-fit patterns on the end face, the recesses in the adapter which are assigned to the form-fit elements advantageously have an elongated shape in the radial direction, thereby making it possible to receive differently-shaped raised areas on the end face of the tool shaft or raised areas which are situated a different radial distance between the shaft axis and the hole pattern in the adapter. To prevent play from occurring in the circumferential direction, the extension of the recesses in the circumferential direction is matched to the extension of the raised areas on the end face of the tool shaft.

BRIEF DESCRIPTION OF THE DRAWINGS

Further advantages and expedient embodiments are depicted in the further claims, the description of the figures, and the drawings.

DETAILED DESCRIPTION OF THE PREFERRED EMBODIMENTS

Figure 1:
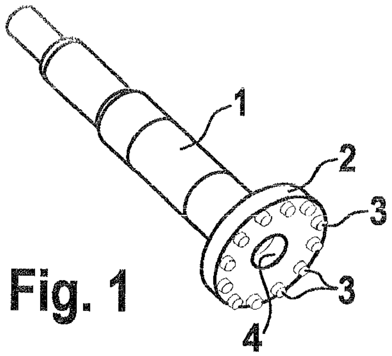
FIG. 1 shows a perspective view of a tool shaft for a machine tool, in particular for a hand-held power tool; the tool shaft includes a locating flange having a greater diameter on one end face, and having axially projecting form-fit elements which are located on the locating flange.

Tool shaft 1 shown in FIG. 1 is used in particular in a hand-held power tool, e.g. a cutting or grinding device, and it is driven in a rotating manner by a drive motor in the machine tool, or it is driven with an oscillating rotational pendulum motion. To receive a tool, tool shaft 1 includes, on an end face, a locating flange having a greater diameter, and which includes on the free end face facing away from tool shaft 1 a plurality of form-fit elements 3 which are designed as raised areas, each of which has, e.g. a round diameter and is cylindrical or conical in design. Form-fit elements 3 are positioned on the outer edge of the end face of locating flange 2 and are distributed evenly around the circumference. A central threaded bore 4 is also formed in the free end face of locating flange 2, which is used to receive a fastening element, e.g. a fastening screw, via which the tool is secured on locating flange 2.

Figure 2:
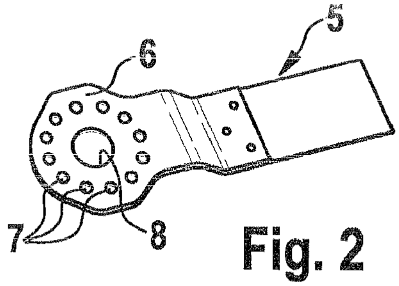
FIG. 2 shows a tool which includes a fastening section with recesses for receiving the form-fit elements on the end face of the tool shaft.

FIG. 2 shows a tool 5 which is provided with a fastening section 6, via which the tool is connected to locating flange 2 of tool shaft 1. Fastening section 6 includes a plurality of recesses 7 which are distributed around the circumference, and which perform the function of form-fit counter elements and are used to receive form-fit elements 3 on locating flange 2. A central recess 8 is also formed in fastening section 6, which is matched to threaded bore 4, and through which the fastening element is guided.

Figure 3:
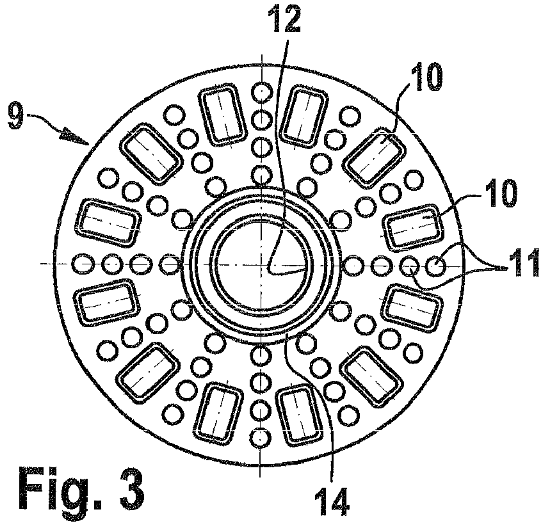
FIG. 3 shows an end-face view of an adapter which is designed for intermediate switching between the tool shaft and the tool, having elongated recesses for receiving the form-fit elements on the end face of the tool shaft, and having axially projecting mandrels on the opposite end face, which penetrate the surface of the fastening flange on the tool when in the installed state.
Figure 4:
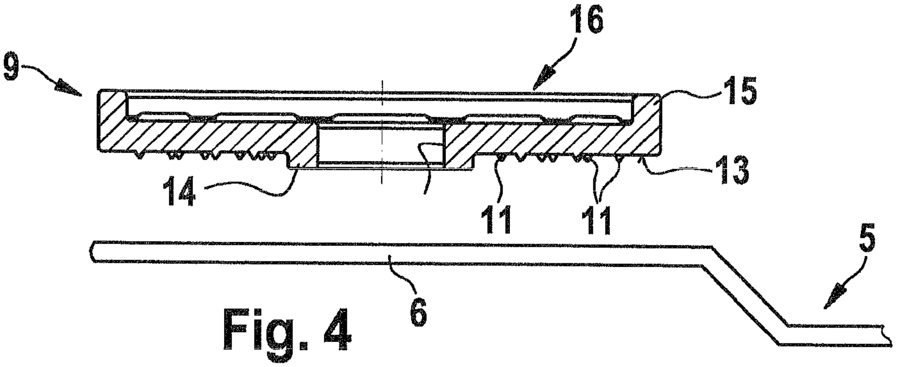
FIG. 4 shows sectional view through the adapter.

An adapter 9 which may be switched between locating flange 2 and fastening section 6 of the tool is shown in FIGS. 3 and 4. The task of adapter 9 is to connect various tools having different fastening sections to locating flange 2 of the tool shaft. For this purpose, adapter 9 includes a plurality of recesses 10 which perform the function of form-fit counter elements and are used to receive form-fit elements 3—which are designed as raised areas—on locating flange 2 of tool shaft 1. Recesses 10 are distributed evenly around the circumference and each has an elongated shape in the radial direction. Recesses 10 are therefore longer in the radial direction than are raised areas 3, while, in the circumferential direction, the width of recesses 10 is matched to the diameter of raised areas 3. As a result, adapter 9 may be connected to locating flanges having different designs, and which differ in terms of the shape of form-fit elements 3 or in the radial distance between the form-fit elements and the shaft axis. Recesses 10 in adapter 9 extend completely through the wall of adapter 9 in the axial direction.

In addition, mandrels 11 are located on adapter 9, and they extend axially past the plane of the end face 13 (FIG. 4). A large number of mandrels 11 of this type is distributed around the circumference; as shown in FIG. 3, several mandrels 11 may be located in a radially-extending row, one behind the other. Each row of mandrels 11 of this type which extends in the radial direction is located between two adjacent recesses 10 which are designed to receive the form-fit elements.

A central recess 12 which is matched to threaded bore 4 in locating flange 2 of tool shaft 1 is formed in adapter 9. Central recess 12 is enclosed by a connector 14 which also extends axially past end face 13 on which mandrels 11 are located. Connector 14 has a greater axial extension away from the plane of end face 13 than do mandrels 11.

A collar 15 is located on adapter 9, on the side which is opposite end face 13. Collar 15 is located radially outwardly and is radially adjacent to a receiving space on end face 16 of adapter, which is provided to receive locating flange 2 of tool shaft 1.

Figure 5:
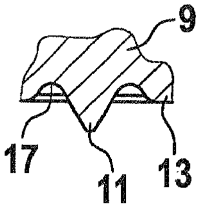
FIG. 5 shows a detailed view of a mandrel which is designed as one piece with the adapter.

As shown in the enlarged view in FIG. 5, mandrels 11 have a conical shape. An annular recess 17 which encloses mandrel 11 is also formed in end face 13, annular recess 17 being set back axially relative to the plane of end face 13. Relative to the plane of end face 13, recess 17 has a shorter axial extension than does mandrel 11. Relative to end face 13, the depth of recess 17 is approximately half as great as the raised area of mandrel 11 is high.

Advantageously, adapter 9 is composed of a magnetic material, thereby simplifying the installation of the adapter on the locating flange of the tool shaft and simplifying the fastening of the tool to the adapter.

While the invention has been illustrated and described as embodied as an adapter for a motor-driven machine tool with a rotatably driveable tool, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

The invention claimed is:

1. An adapter for a motor-driven machine tool which includes a tool driven in an oscillating rotational pendulum motion, the machine tool including a driveable tool shaft (1), the end face of which is designed as a locating flange (2) having at least one form-fit element (3) for receiving and fastening the tool (5), wherein the adapter (9) includes, on an end face (16), form-fit counter elements (10) which are matched to the form-fit elements (3) of the tool shaft (1), and wherein a plurality of axially projecting mandrels (11) is distributed around the circumference on the opposite end face (13) of the adapter (9).

2. The adapter as recited in claim 1, wherein the mandrels (11) are designed as single pieces with the adapter (9).

3. The adapter as recited in claim 1, wherein the adapter (9) is annular in design and includes a central recess (12).

4. The adapter as recited in claim 3, wherein a connector (14) which abuts the central recess (12) is provided in the annular adapter (9) and extends axially past the end face (13) on which the mandrels (11) are situated.

5. The adapter as recited in claim 4, wherein the mandrels (11) have a shorter axial extension than does the connector (14).

6. The adapter as recited in claim 1, wherein the mandrels (11) include—relative to the end face plane—an annular recess (17) which is set back axially and encloses the mandrel (11).

7. The adapter as recited in claim 6, wherein, in the axial direction, the recess (17) has an axial extension that is shorter than the axial extension of the mandrels (11).

8. The adapter as recited in claim 7, wherein the axial depth of the recess (17) is half as great as the axial extension of the mandrels (11).

9. The adapter recited in claim 1, wherein the mandrels (11) are conical in design.

10. The adapter recited in claim 1, wherein a plurality of mandrels (11) is located one after the other in the radial direction.

11. The adapter recited in claim 1, wherein a plurality of mandrels (11) is located, in each case, between two adjacent form-fit counter elements (10) in the adapter (9).

12. The adapter recited in claim 1, wherein the form-fit counter elements (10) in the adapter (9) are designed as recesses (10).

13. The adapter as recited in claim 12, wherein the recesses (10) are elongated in the radial direction.

14. The adapter as recited in claim 1, wherein the adapter (9) is composed of a magnetic material.

* * * * *